US009533564B2

(12) United States Patent
Asano et al.

(10) Patent No.: US 9,533,564 B2
(45) Date of Patent: Jan. 3, 2017

(54) GRILLE APPARATUS FOR VEHICLE

(71) Applicant: AISIN SEIKI KABUSHIKI KAISHA, Kariya-shi (JP)

(72) Inventors: Yoshimasa Asano, Kariya (JP); Hideki Kawabata, Chita-gun (JP); Yasuaki Nishio, Kariya (JP); Shuhei Uchida, Chiryu (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 342 days.

(21) Appl. No.: 14/133,846

(22) Filed: Dec. 19, 2013

(65) Prior Publication Data

US 2014/0194052 A1     Jul. 10, 2014

(30) Foreign Application Priority Data

Jan. 10, 2013   (JP) .................................. 2013-002960

(51) Int. Cl.
   *B60K 11/08*     (2006.01)
(52) U.S. Cl.
   CPC .............. *B60K 11/085* (2013.01); *B60K 11/08* (2013.01)
(58) Field of Classification Search
   CPC . B60R 19/52; B60R 2019/525; B60K 11/085; B60K 11/08
   USPC ....... 454/335, 143, 154–155, 166; 180/68.1; 296/193.1
   See application file for complete search history.

(56) References Cited

U.S. PATENT DOCUMENTS

| 4,410,032 A | 10/1983 | Mori | |
|---|---|---|---|
| 2007/0077880 A1* | 4/2007 | Lee | G06F 1/20 454/285 |
| 2010/0071977 A1* | 3/2010 | Ritz | B60K 11/085 180/68.1 |
| 2010/0243352 A1* | 9/2010 | Watanabe | B60K 11/085 180/68.1 |

(Continued)

FOREIGN PATENT DOCUMENTS

| DE | 31 51 435 A1 | 7/1982 |
|---|---|---|
| DE | 10 2004 026 419 A1 | 12/2005 |

(Continued)

OTHER PUBLICATIONS

Extended European Search Report issued May 16, 2014 in Patent Application No. 14150621.2.

(Continued)

*Primary Examiner* — Steven B McAllister
*Assistant Examiner* — Ko-Wei Lin
(74) *Attorney, Agent, or Firm* — Oblon, McClelland, Maier & Neustadt, L.L.P.

(57) ABSTRACT

A grille apparatus for a vehicle includes a first cover arranged at an opening portion of a front grille, a second cover arranged at the opening portion of the front grille, and a drive mechanism changing a relative position of the first cover and the second cover in response to a driving force of a drive source, in which the drive mechanism changes an opening amount of the front grille by performing an opening operation moving the second cover to a rear of the first cover, and by performing a closing operation returning the second cover to a fully-closed position, the fully-closed position before moving the second cover to the rear of the first cover while maintaining the first cover and the second cover within the opening portion of the front grille.

7 Claims, 13 Drawing Sheets

(56) References Cited

U.S. PATENT DOCUMENTS

| | | | |
|---|---|---|---|
| 2011/0005851 A1* | 1/2011 | Doroghazi | B60K 11/085 180/68.1 |
| 2011/0070817 A1* | 3/2011 | Walters | B60K 11/085 454/155 |
| 2011/0073395 A1* | 3/2011 | Lee | B60K 11/085 180/68.1 |
| 2012/0074729 A1 | 3/2012 | Fenchak et al. | |
| 2012/0186890 A1 | 7/2012 | Hori et al. | |

FOREIGN PATENT DOCUMENTS

| | | |
|---|---|---|
| DE | 10 2006 053 883 A1 | 5/2008 |
| DE | 20 2011 000 454 U1 | 6/2011 |
| JP | 55-142328 U | 10/1980 |
| JP | 57-109020 U | 7/1982 |
| JP | 58-139519 U | 9/1983 |
| JP | 60-106860 U | 7/1985 |
| JP | 2012-148705 | 8/2012 |

OTHER PUBLICATIONS

Japanese Office Action issued Jul. 12, 2016 in Patent Application No. 2013-002960 (with English language translation).

* cited by examiner

GRILLE APPARATUS FOR VEHICLE

CROSS REFERENCE TO RELATED APPLICATIONS

This application is based on and claims priority under 35 U.S.C. §119 to Japanese Patent Application 2013-002960, filed on Jan. 10, 2013, the entire content of which is incorporated herein by reference.

TECHNICAL FIELD

This disclosure generally relates to a grille apparatus for a vehicle.

BACKGROUND DISCUSSION

A known grille apparatus for a vehicle configured with plural cover members (elongated plates for the grille apparatus) arranged at an opening portion of a front grille of a vehicle to change an opening amount of the front grille by rotating the cover members is disclosed in JPS58-139519U (hereinafter referred to as Patent reference 1).

That is, for example, when a vehicle runs at a high speed, an aerodynamic performance (for example, Cd value, that is, coefficient of drag) of the vehicle is enhanced by limiting a flow rate of air flowing into an engine room by reducing an opening amount of a front grille (closed state). When starting an engine, warm-up time is shortened by reducing the flow rate of air introduced into a radiator of the vehicle. When an engine temperature has increasing tendency, the opening amount of the front grille is increased to raise the flow rate of air flowing into the engine room (open state) so that the engine temperature is controlled at an appropriate temperature.

However, in these years, shapes of cover members arranged at an opening portion of a front grille tend to be three dimensional including a three-dimensional curved surface in terms of designability. Therefore, opening and closing operations in response to the rotational movement of the aforementioned cover members disclosed in Patent reference 1 may not be able to change the opening amount of the front grille sufficiently.

Another grille apparatus is disclosed in 2012-148705A (hereinafter referred to as Patent reference 2). The grille apparatus disclosed in Patent reference 2 is configured with a second cover member performing opening and closing operations between a closed position to close an opening portion of a front grille and an open position to open the opening portion of the front grille.

That is, the second cover member is arranged at the position where frontward of first cover members is covered and moves to a position where the frontward of the first cover members is exposed. Then, an opening amount of the front grille may be changed, or varied reliably regardless of shapes of the cover members.

However, according to Patent reference 2, because a stroke of the second cover member for the opening and closing operations, that is, a moving distance of the second cover member, is increased, the grille apparatus disclosed in Patent reference 2 requires not only time to open and close the opening portion of the front grille but also a large space for arranging a housing portion for the second cover member and for arranging a movement mechanism that moves the second cover member. Thus, the mountability is decreased.

A need thus exists for a grille apparatus for a vehicle which is not susceptible to the drawback mentioned above.

SUMMARY

According to an aspect of this disclosure, a grille apparatus for a vehicle includes a first cover arranged at an opening portion of a front grille, a second cover arranged at the opening portion of the front grille, and a drive mechanism changing a relative position of the first cover and the second cover in response to a driving force of a drive source, in which the drive mechanism changes an opening amount of the front grille by performing an opening operation moving the second cover to a rear of the first cover, and by performing a closing operation returning the second cover to a fully-closed position, the fully-closed position before moving the second cover to the rear of the first cover while maintaining the first cover and the second cover within the opening portion of the front grille.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
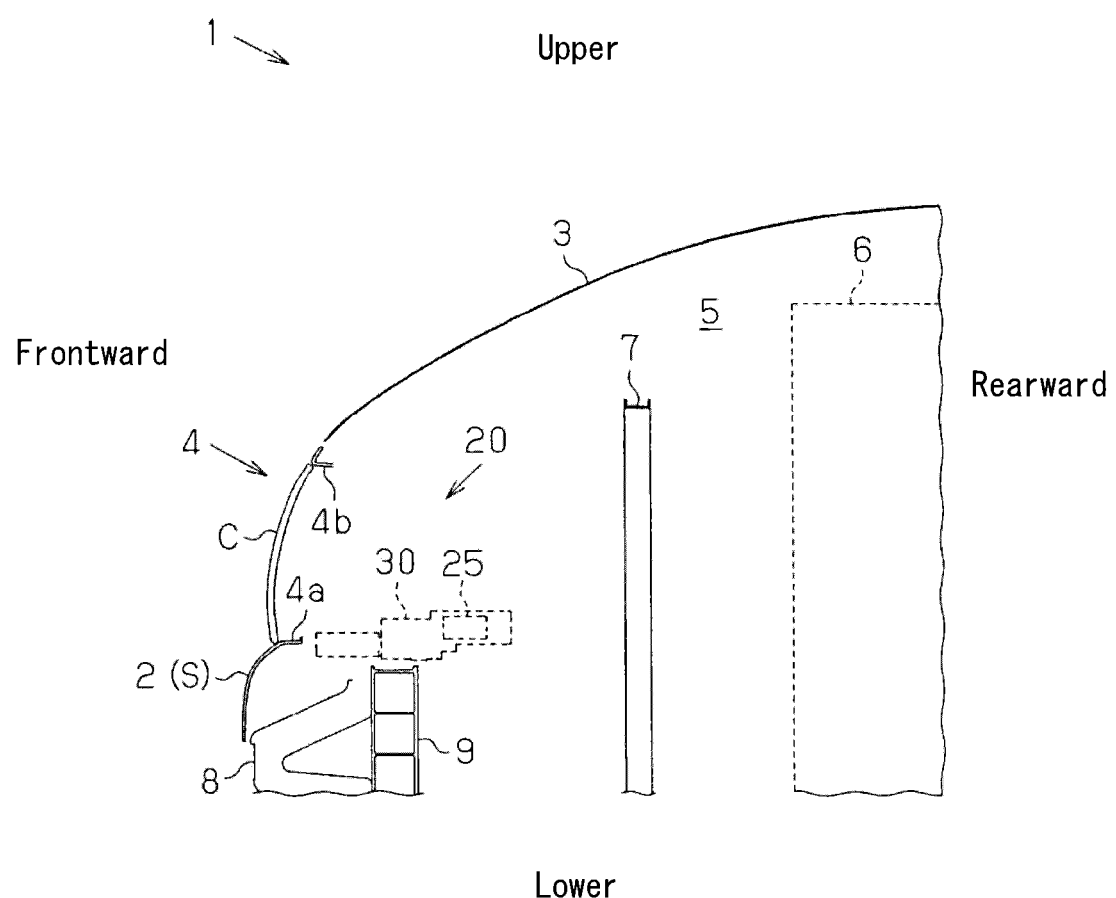
FIG. 1 is a side view schematically illustrating a front portion of a vehicle on which a grille apparatus for a vehicle is mounted according to an embodiment disclosed here.

A grille apparatus 20 for a vehicle according to an embodiment will be described referring to drawings. As illustrated in FIG. 1, a front grille 2 configuring a front design face S of a vehicle 1 includes an opening portion of the front grille 2 (a grille opening portion 4) which connects an outer space at a front of the vehicle 1 and an inner space of a vehicle body 3. A radiator 7 is accommodated in an engine room 5 which is arranged at the vehicle body 3 to cool an engine 6.

Figure 2:
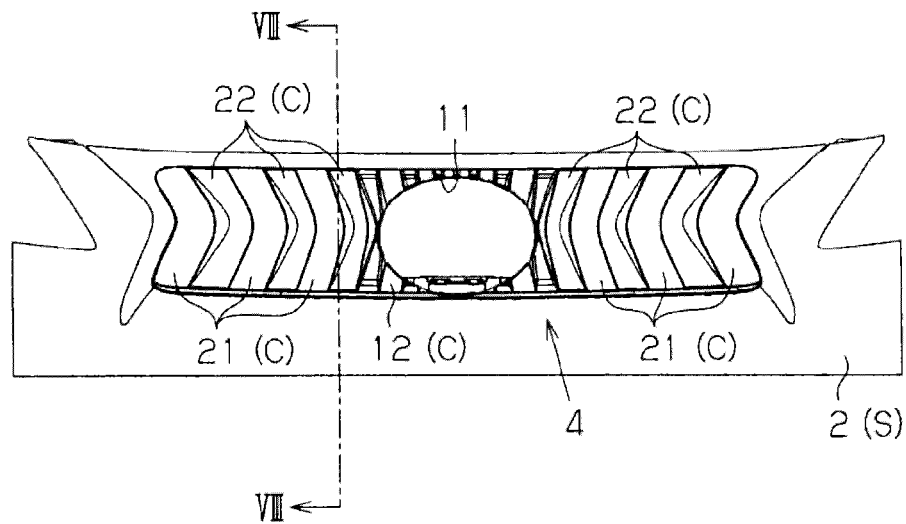
FIG. 2 is a front view of the grille apparatus for a vehicle (fully-closed state) according to the embodiment.
Figure 3:
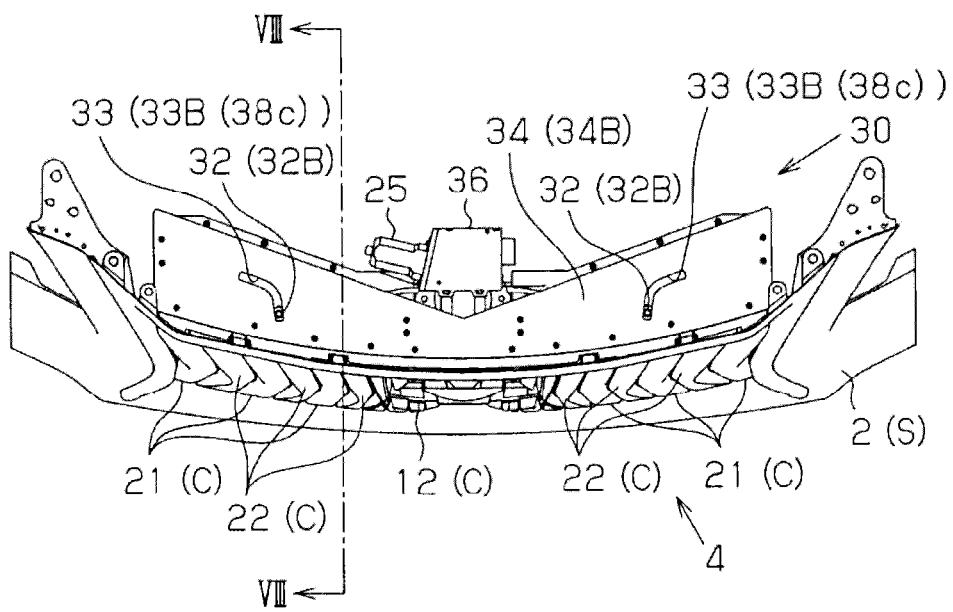
FIG. 3 is a plan view of the grille apparatus for a vehicle (fully-closed state) according to the embodiment.

Specifically, as illustrated in FIGS. 1 to 3, the grille opening portion 4 of the embodiment is arranged at a center in a width direction of the front grille 2 (left-right direction in FIGS. 2 and 3) and, for details, the grille opening portion 4 of the embodiment is arranged above a bumper 8 and a bumper reinforcement 9. As illustrated in FIG. 1, the radiator 7 is arranged at a position frontward of the engine 6 in the engine room 5, the position where the radiator 7 receives air flowing via the grille opening portion 4 into the engine room 5.

As illustrated in FIGS. 1 to 5, according to the embodiment, plural cover members C are arranged inside the grille opening portion 4. The grille opening portion 4 takes air flowing via clearances formed between each of the cover members C into the engine room 5.

Figure 4:
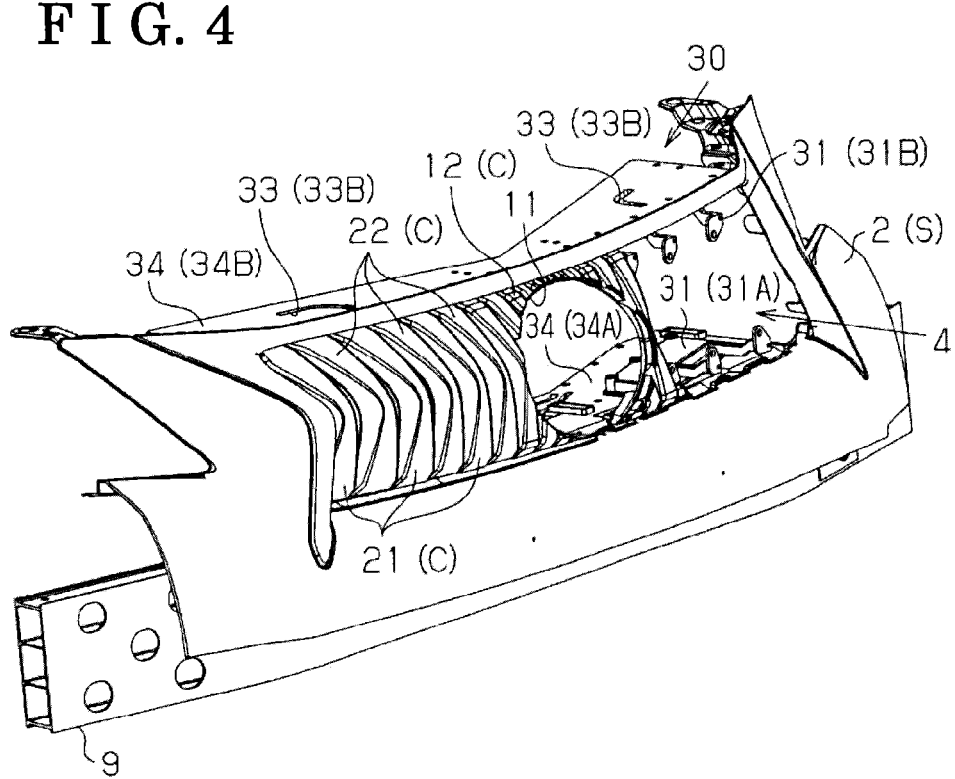
FIG. 4 is a perspective view of the grille apparatus for a vehicle (fully-closed state) according to the embodiment.
Figure 5:
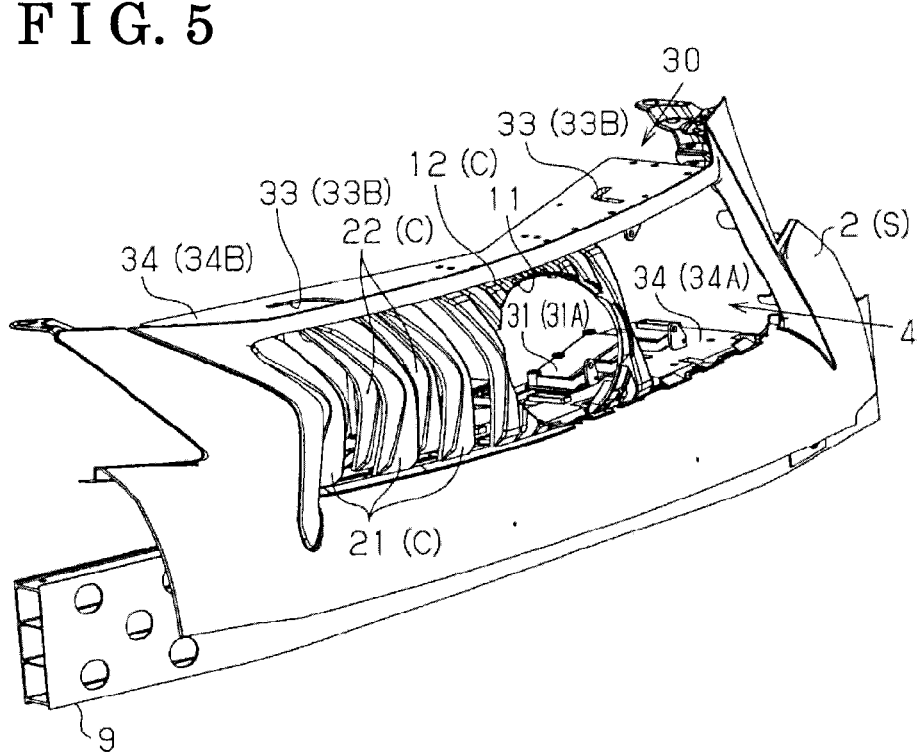
FIG. 5 is a perspective view of the grille apparatus for a vehicle (fully-open state) according to the embodiment.

In particular, a center cover 12 is arranged inside the grille opening portion 4 to close a center in a width direction of the grille opening portion 4. A hole portion 11 is formed at the center cover 12 of the embodiment for mounting an automobile emblem plate of the vehicle 1. Plural first covers 21 and plural second covers 22 are arranged at opposing sides in the width direction of the center cover 12. FIGS. 4 and 5 illustrate a state where the first covers 21 and the second covers 22 arranged at one of the opposing sides in the width direction of the center cover 12 (at right in FIGS. 4 and 5) are removed. A drive mechanism 30 is positioned at a rear of the cover members C to change a relative position of the first covers 21 and the second covers 22 in response to a driving force of a motor 25 (serving as a drive source) as a drive source.

Further in detail, as illustrated in FIGS. 2 and 3, the first covers 21 and the second covers 22 are extended in an up-down direction of the vehicle 1 (up-down direction in FIG. 2) being formed in a three dimensional-shape such that each of middle portions in the up-down direction of the first covers 21 and the second covers 22 protrudes toward the center in the width direction of the grille opening portion 4 and forward of the vehicle 1. The first covers 21 are arranged inside the grille opening portion 4 to be spaced from one another in the width direction of the grille opening portion 4. The second covers 22 are arranged inside the grille opening portion 4 to be spaced from one another in the width direction of the grille opening portion 4. According to the embodiment, for example, three each of the first covers 21 and the second covers 22 are arranged at each of the opposing sides in the width direction of the center cover 12. The drive mechanism 30 of the embodiment changes the relative position of the first covers 21 and the second covers 22 between a fully-closed state of the grille apparatus 20 for a vehicle (fully-closed position P1) and a fully-open state of the grille apparatus 20 for a vehicle (fully-open position P3). As illustrated in FIG. 4, the first covers 21 and the second covers 22 are arranged alternately in line in the width direction of the grille opening portion 4 so that the grille apparatus 20 for a vehicle is in the fully-closed state (fully-closed position P1). As illustrated in FIG. 5, the second covers 22 move to a rear of the respective first covers 21 so that the grille apparatus 20 for a vehicle is in the fully-open state (fully-open position P3).

Figure 6:
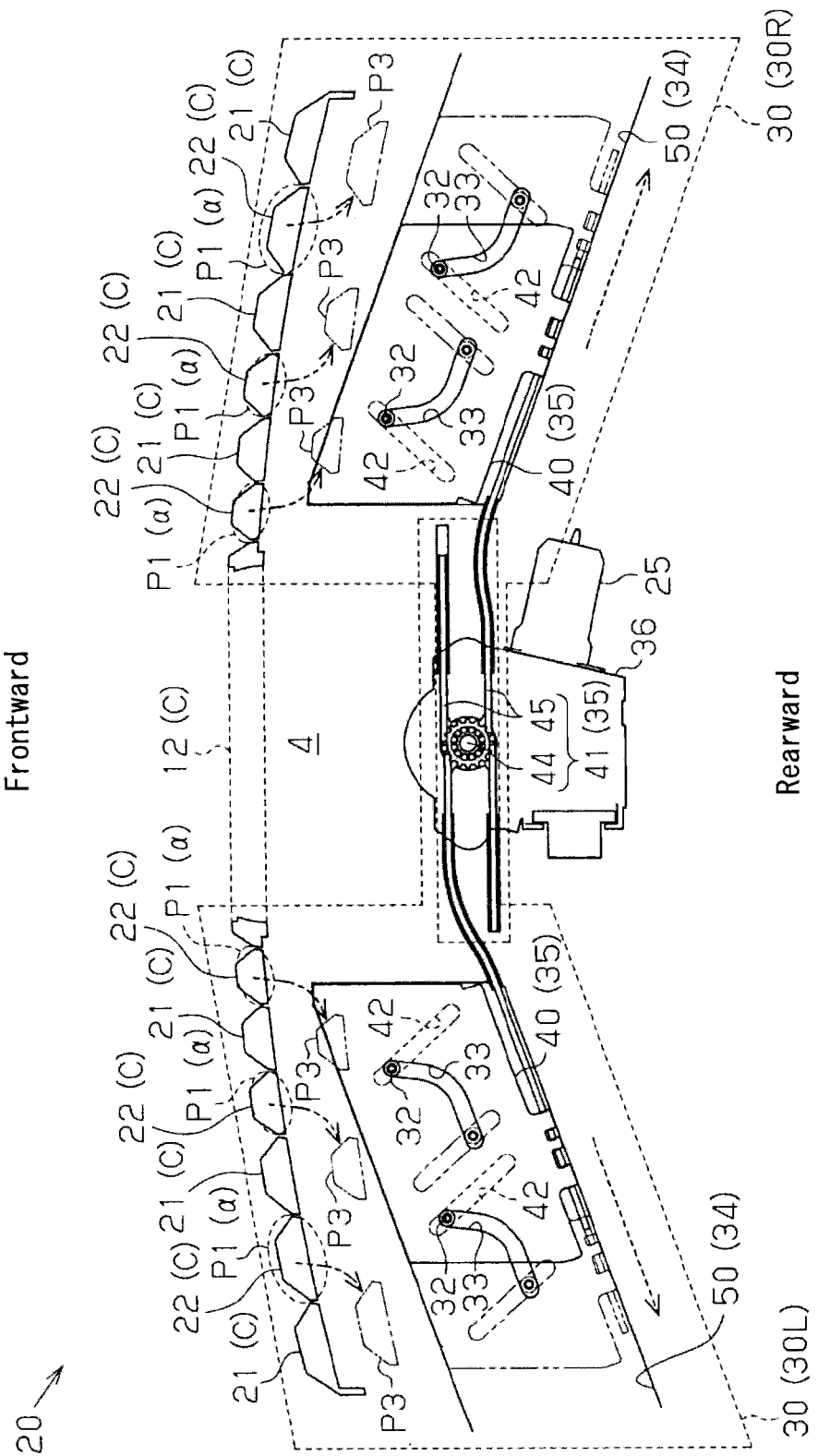
FIG. 6 is a view schematically illustrating a configuration of the grille apparatus for a vehicle according to the embodiment.

As illustrated in FIG. 6, the size of the clearance formed between the cover members C is changed, or varied as the relative position of first covers 21 and the second covers 22 is changed, or varied in the grille opening portion 4. In particular, the grille opening portion 4 is closed when the first covers 21 and the second covers 22 are arranged alternately in line. Opening areas a are formed between the first covers 21 adjacent to one another in the width direction of the grille opening portion 4 as the second covers 22 move to the rear of the corresponding first covers 21. According to the embodiment, the grille apparatus 20 for a vehicle is configured such that the opening amount of the front grille 2 may be changed, or varied.

Next, a drive structure for opening and closing the cover members C of the grille apparatus 20 for a vehicle according to the embodiment will be described.

According to the embodiment, the center cover 12 and the first covers 21 are fixed to opposite open ends in the up-down direction of the grille opening portion 4. As illustrated in FIG. 6, the drive mechanism 30 may move the second covers 22 to the rear of the respective first covers 21 which are adjacent to the second covers 22 in the fully-closed state of the grille apparatus 20 for a vehicle by sliding the second covers 22 in a vehicle front-rear direction and in the width direction of the grille opening portion 4.

Figure 7:
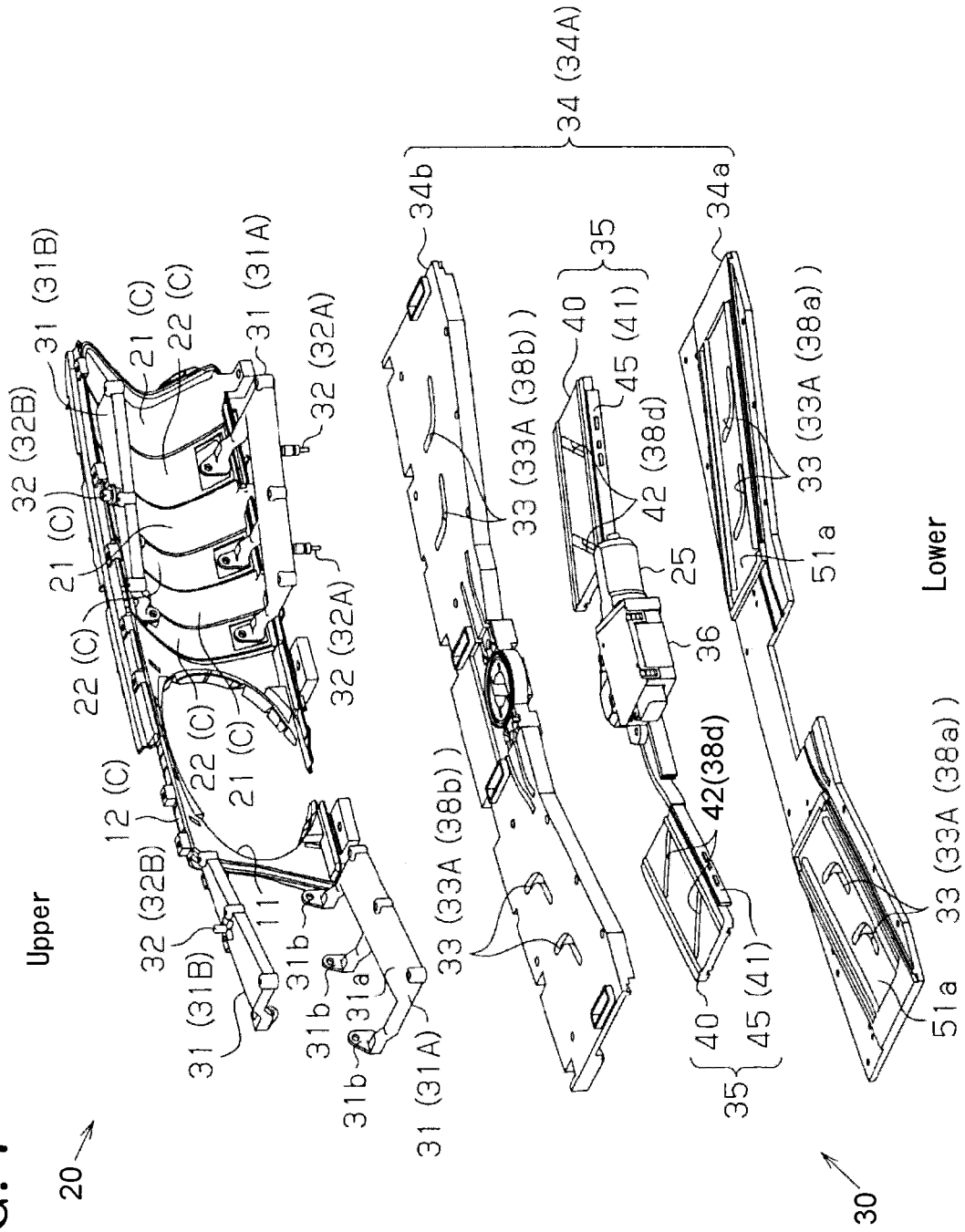
FIG. 7 is an exploded perspective view of the grille apparatus for a vehicle according to the embodiment.

Further in detail, as illustrated in FIG. 7, the drive mechanism 30 of the embodiment includes a supporting member 31, a guide protrusion 32, and a bracket 34. The supporting member 31 supports the second covers 22. The guide protrusion 32 is mounted to the supporting member 31. The bracket 34 includes a guide groove 33 that engages with the respective guide protrusion 32. The drive mechanism 30 includes a driving force transmission mechanism 35 which transmits the driving force of the motor 25 to the supporting member 31 to move the second covers 22 integrally with the supporting member 31.

That is, the second covers 22 supported by the supporting member 31 slide on a virtual plane orthogonal to an axial line of the shaft-shaped guide protrusion 32 when the supporting member 31 is moved to change an engagement position of the guide protrusion 32 and the guide groove 33. According to the embodiment, a movement trajectory of the second cover 22 (and the supporting member 31) is determined by a groove shape of the guide groove 33.

As illustrated in FIGS. 6 and 7, the motor 25 as a drive source is arranged at a substantially center in the width direction of the grille opening portion 4 and a rearward of the center cover 12. The motor 25 is mounted with a reduction gear 36 that reduces a rotational speed of the motor 25. Further, the grille apparatus 20 for a vehicle of the embodiment includes the left-right pair of the drive mechanisms 30 (a first drive mechanism 30L and a second drive mechanism 30R) arranged to sandwich the motor 25 in the width direction of the grille opening portion 4. The single motor 25 drives the second covers 22 arranged at the opposing sides of the center cover 12 in the width direction of the grille opening portion 4.

Figure 8:
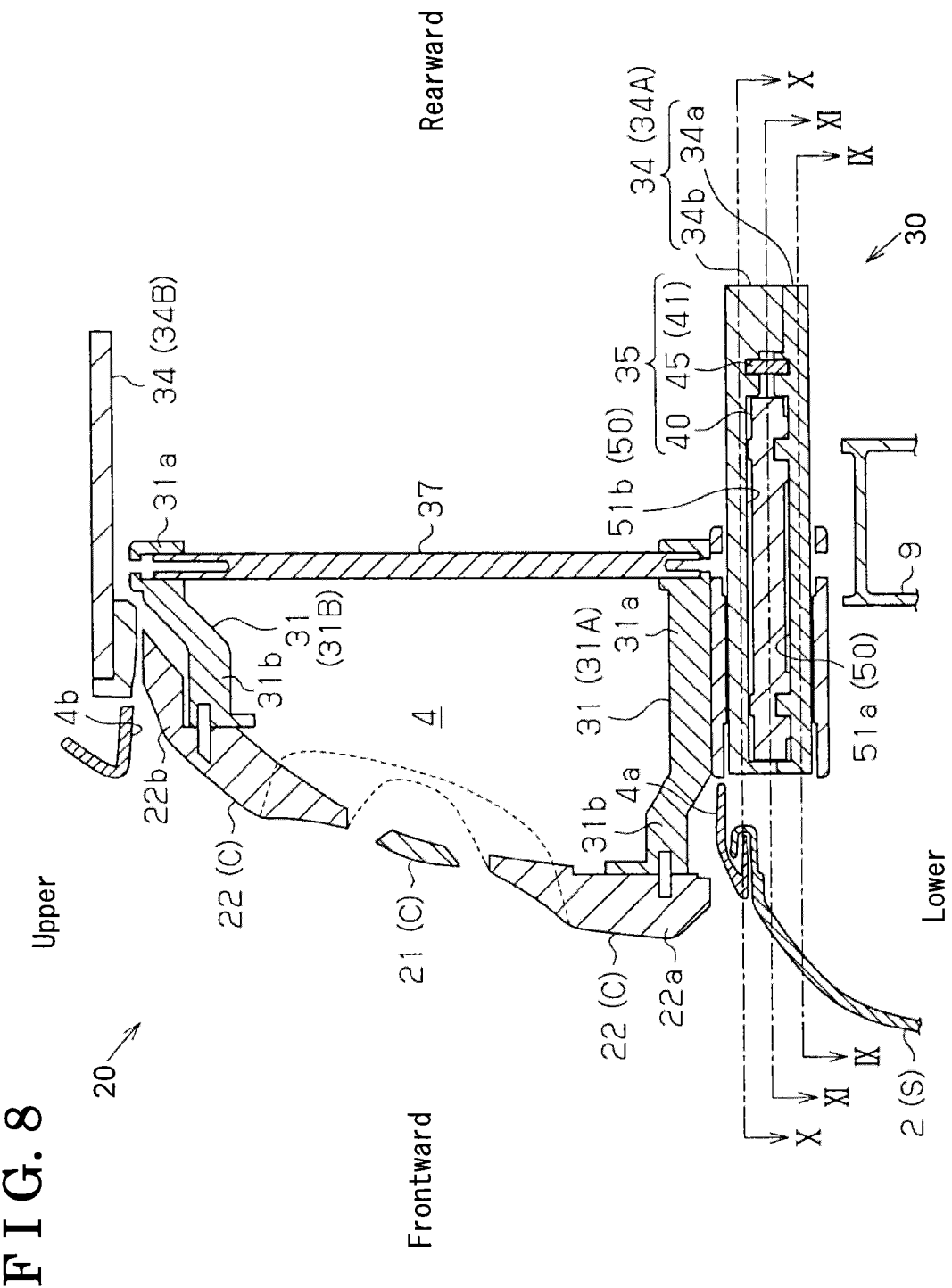
FIG. 8 is a cross-sectional view of the grille apparatus which is taken along line VIII-VIII in FIGS. 2 and 3.

For convenience of explanation, a first side of the drive mechanisms 30 (the second drive mechanism 30R) will be illustrated while a second side of the drive mechanisms 30 (the first drive mechanism 30L) will not be described. Further in detail, as illustrated in FIGS. 7 and 8, the drive mechanism 30 of the embodiment includes the upper-lower pair of the supporting members 31 (a first supporting member 31A, a second supporting member 31B). The lower-arranged first supporting member 31A supports a lower end portion 22a of each of the second covers 22 while the upper-arranged second supporting member 31B supports an upper end portion 22b of each of the second covers 22. Each of the supporting members 31 (the first supporting member 31A, the second supporting member 31B) includes a base portion 31a and plural (for example, three) branch portions 31b. The base portion 31a extends in the width direction of the grille opening portion 4 (left-right direction in FIG. 7). The branch portions 31b extend frontward in the vehicle front-rear direction from the base portion 31a so that front ends in the vehicle front-rear direction of the branch portions 31 b are fixed to the respective second covers 22.

Each of the supporting members 31 (the first supporting member 31A, the second supporting member 31B) is arranged at a lower end portion 4a (serving as an end portion) and an upper end portion 4b (serving as an end portion) of the grille opening portion 4, respectively. The lower end portion 4a and the upper end portion 4b are arranged at opposing ends of the grille opening portion 4, the opposing ends orthogonal to the sliding direction of the second covers 22, that is, orthogonal to the width direction of the grille opening portion 4 and orthogonal to the vehicle front-rear direction. The supporting members 31 (the first supporting member 31A, the second supporting member 31B) are connected one another by a shaft-shaped connection member 37 and are bridged between the base portions 31a of the supporting members 31 (the first supporting member 31A, the second supporting member 31B).

According to the embodiment, the first supporting member 31A supporting the lower end portions 22a of the second covers 22 includes shaft-shaped, plural (for example, two) first guide protrusions 32A protruding downward. At the lower of the first supporting member 31A, a first bracket 34A including plural first guide grooves 33A (for example, two, for each of the first supporting member 31A) engaging with the first guide protrusions 32A is provided.

Figure 9:
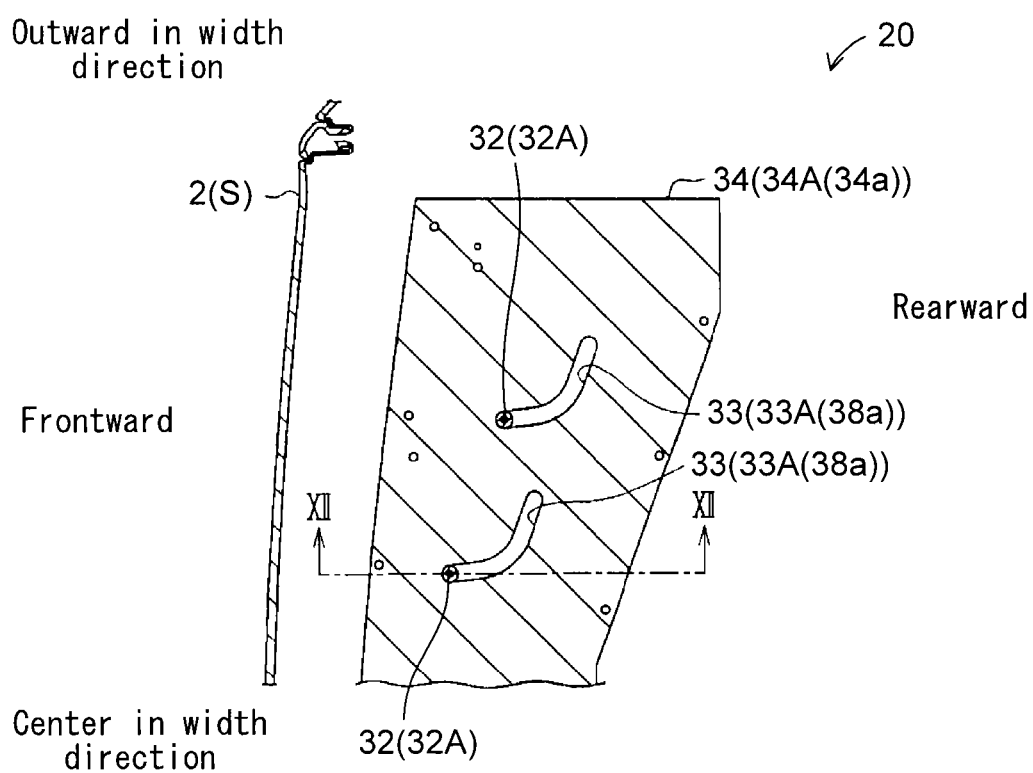
FIG. 9 is a cross-sectional view of the grille apparatus which is taken along line IX-IX in FIG. 8.
Figure 10:
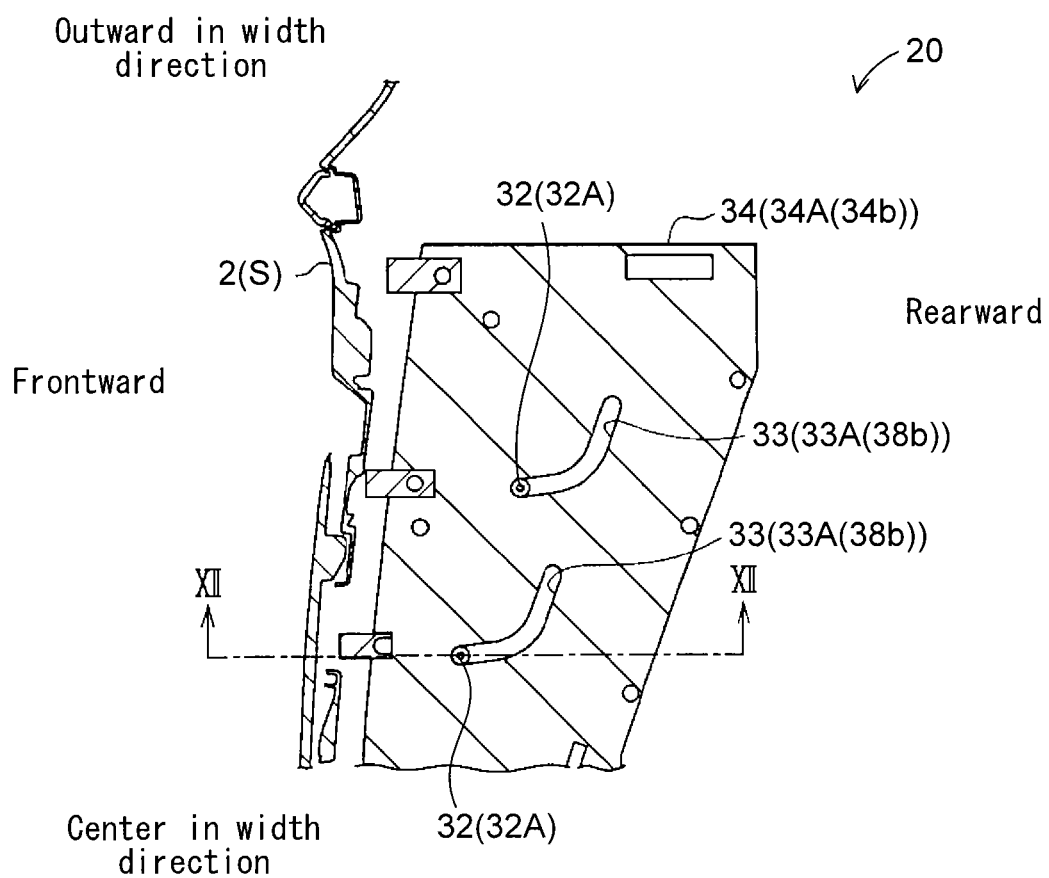
FIG. 10 is a cross-sectional view of the grille apparatus which is taken along line X-X in FIG. 8.

In particular, the first bracket 34A is formed such that a first member 34a and a second member 34b both formed in a substantially elongated flat plate are overlapped one another. As illustrated in FIGS. 9 and 10, the first guide groove 33A includes oblong hole-shaped first and second through holes 38a and 38b arranged at the first member 34a and the second member 34b, respectively. The first and second through holes 38a and 38b penetrate in a thickness direction of the first member 34a and the second member 34b, respectively.

As illustrated in FIGS. 3 and 7, a second supporting member 31B supporting the upper end portions 22b of the second covers 22 include shaft-shaped second guide protrusions 32B protruding upward. At the upper of the second supporting member 31B, a second bracket 34B formed in an elongated flat plate-shape and including second guide grooves 33B engaging with the second guide protrusions 32B is provided (upper in FIG. 8). The second guide grooves 33B include oblong hole-shaped third through holes 38c penetrating in the thickness direction of the second bracket 34B.

According to the embodiment, the drive mechanisms 30 (the first drive mechanism 30L and the second drive mechanism 30R) driving the second covers 22 which are arranged at the opposing sides in the width direction of the center cover 12 are formed integrally with the first bracket 34A (configured by the first member 34a and the second member 34b) and the second bracket 34B that are symmetrically connected. The lower-arranged first bracket 34A and the upper-arranged second bracket 34B are positioned at the lower end portion 4a and the upper end portion 4b of the grille opening portion 4, respectively, in a substantially horizontal manner along with the width direction of the grille opening portion 4 so that the first bracket 34A and the second bracket 34B are in parallel with one another.

As illustrated in FIGS. 6 and 7, the driving force transmission mechanism 35 of the embodiment includes a moving body 40 and a conversion mechanism 41. The moving body 40 is connected to the first supporting member 31A. The conversion mechanism 41 converts a rotation of the motor 25 as a drive source into a reciprocating movement of the moving body 40. According to the embodiment, the second covers 22 supported by the first supporting member 31A perform opening and closing operations as the first supporting member 31A moves in response to the reciprocating movement of the moving body 40.

Figure 11:
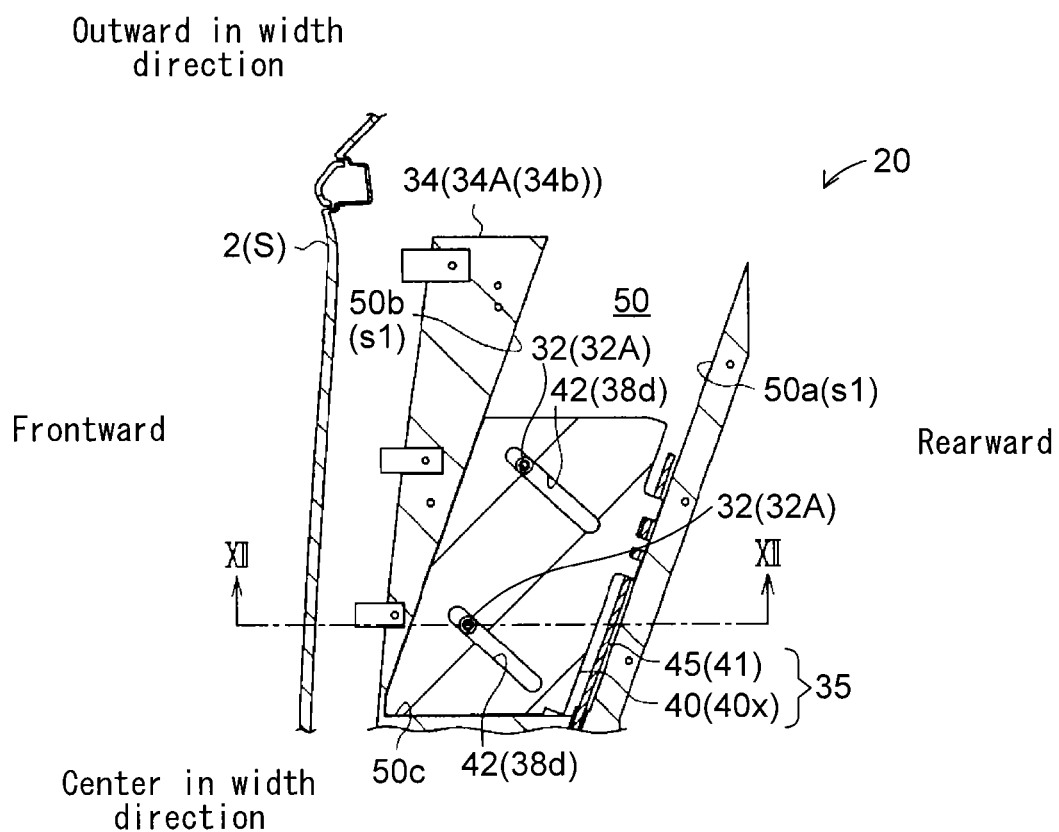
FIG. 11 is a cross-sectional view of the grille apparatus which is taken along line XI-XI in FIG. 8.

Further in detail, as illustrated in FIG. 11, the moving body 40 of the embodiment is formed in a substantially rectangular flat plate (formed in a slightly parallelogram shape). The moving body 40 includes plural engaging recessed portions 42 engaging with the first guide protrusions 32A of the first supporting member 31A. Specifically, the engaging recessed portions 42 include oblong hole-shaped fourth through holes 38d penetrating in the thickness direction of the moving body 40. The engaging recessed portion 42 and the first guide protrusion 32A are engaged with one another so that the moving body 40 of the embodiment is connected to the first supporting member 31A in a state where the first supporting member 31A can move in response to the reciprocating movement of the moving body 40.

As illustrated in FIG. 6, the conversion mechanism 41 of the embodiment is configured with a pinion gear 44 rotated by a motor drive and rack belts 45 meshing with the pinion gear 44. That is, the rack belt 45 is a rack gear made of a flexible material, for example, resin. The rack belt 45 meshes with the pinion gear 44 to be configured as a known rack and pinion mechanism. As illustrated in FIG. 11, an end in a longitudinal direction of the rack belt 45 is fixed to a longitudinal side 40x of the moving body 40. Accordingly, the conversion mechanism 41 of the embodiment allows the moving body 40 to perform the reciprocating movement in a longitudinal direction of the rack belt 45.

Further in detail, according to the embodiment, as illustrated in FIGS. 7, 8, 11 and 12, the lower-arranged first bracket 34A includes a storage chamber 50 accommodating the moving body 40 while allowing the reciprocating movement of the moving body 40 along with the longitudinal direction of the first bracket 34A, that is, the width direction of the grille opening portion 4 (left-right direction in FIG. 6).

Figure 12:
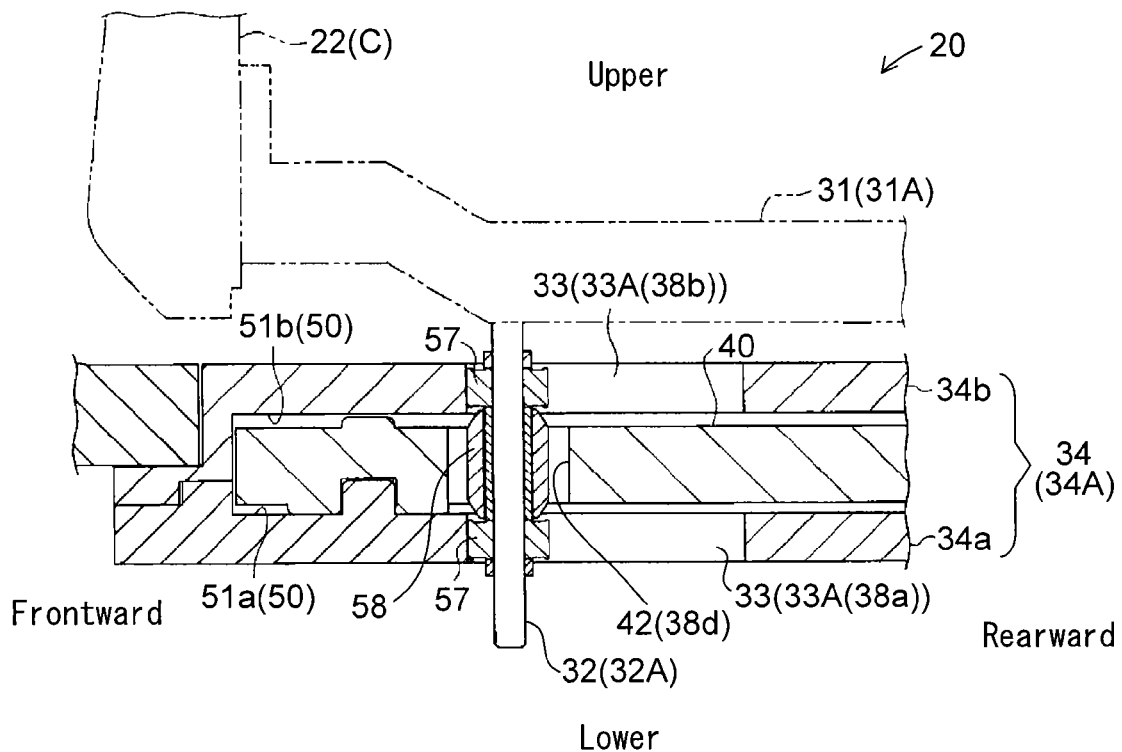
FIG. 12 is a cross-sectional view of the grille apparatus which is taken along line XII-XII in FIGS. 9, 10 and 11.

In particular, according to the embodiment, as illustrated in FIGS. 6, 7, and 12, the first member 34a and the second member 34b configuring the first bracket 34A include slidable recessed portions 51a, 51b, respectively, where the moving body 40 and the rack belt 45 are arranged. That is, according to the embodiment, as illustrated in FIGS. 7 and 12, the first member 34a and the second member 34b are assembled so that the first member 34a and the second member 34b sandwich the moving body 40 (and the end in the longitudinal direction of the rack belt 45). The storage chamber 50 accommodating the moving body 40 is formed with the slidable recessed portions 51a, 51b which close opening portions of the slidable recessed portions 51a, 51b one another.

According to the embodiment, as illustrated in FIG. 11, the storage chamber 50 includes opposite sidewalls 50a, 50b. Each of the opposite sidewalls 50a, 50b extending in the longitudinal direction of the first bracket 34A includes a guiding surface s1 on which the moving body 40 slides inside the storage chamber 50. According to the embodiment, the guide surface s1 configured with each of the sidewalls 50a, 50b is formed such that the moving body 40 moves obliquely rearward in the vehicle front-rear direction when the moving body 40 moves from the center to an outer portion in the width direction of the grille opening portion 4.

According to the embodiment, as illustrated in FIG. 12, the first supporting member 31A is assembled such that the first guide protrusion 32A protrudes downward of the first supporting member 31A to penetrate the first through hole 38a, the second through hole 38b and the fourth through hole 38d. The first through hole 38a and the second through hole 38b are arranged at the first member 34a and the second member 34b, respectively, of the first guide groove 33A of the first bracket 34A. The fourth through hole 38d is arranged at the engaging recessed portion 42 of the moving body 40. Thus, according to the embodiment, the second covers 22 supported by the first supporting member 31A move in response to the reciprocating movement of the moving body 40 inside the storage chamber 50 by connecting the moving body 40 to the first supporting member 31A.

According to the embodiment, as illustrated in FIGS. 9 and 10, each of the first and second through holes 38a, 38b arranged at the first guide groove 33A of the first bracket 34A is formed in a curved groove-shape and extended in the vehicle front-rear direction at the center in the width direction of the grille opening portion 4 while extending in the width direction of the grille opening portion 4 at an outer portion in the width direction of the grille opening portion 4. The second guide groove 33B of the upper-arranged second bracket 34B is formed in the same curved groove-shape as the first guide groove 33A of the first bracket 34A. According to the embodiment, as illustrated in FIG. 6, the grille apparatus 20 for a vehicle can perform the opening operation forming the opening areas a by moving the second covers 22 to the rear of the respective first covers 21 (fully-open position P3) without interfering the first covers 21 that are adjacent to the second covers 22 in the width direction of the grille opening portion 4. The grille apparatus 20 for a vehicle can perform the closing operation by returning the relative position of the first covers 21 and the second covers 22 to the fully-closed position P1, the relative position before the second covers 22 move to the rear of the respective first covers 21.

According to the embodiment, as illustrated in FIG. 11, the engaging recessed portion 42 (the fourth through hole 38d) of the moving body 40 is formed such that the first guide protrusion 32A moves obliquely forward in the vehicle front-rear direction from the center to outward in the width direction of the grille opening portion 4 (up-down direction in FIG. 11). That is, a wall surface of the engaging recessed portion 42 presses the first guide protrusion 32A in response to the reciprocating movement of the moving body 40. The first supporting member 31A and the second covers 22 move in response to the driving force transmitted via the first guide protrusion 32A. According to the embodiment, the driving force is transmitted efficiently by applying the oblong hole-shaped engaging recessed portion 42.

As illustrated in FIG. 12, the first guide protrusion 32A includes rollers 57 and 58 provided at positions where the first guide groove 33A and the engaging recessed portion 42 are engaged with the first guide protrusion 32A. Because the rollers 57, 58 are slidably in contact with, and rotate on the wall surfaces of the first guide groove 33A and engaged recessed portion 42, a smooth movement of the second covers 22 is ensured.

Next, an operation (performance) of the grille apparatus 20 for a vehicle configured as above will be described. As illustrated in FIGS. 6 and 13 to 15, the grille apparatus 20 for a vehicle of the embodiment performs the opening operation by moving the moving body 40 from the center to the outer portion in the width direction of the grille opening portion 4 (from left to right in FIGS. 13 to 15) in response to the driving force of the motor 25. The grille apparatus 20 for a vehicle performs the closing operation by moving the moving body 40 from the outer portion to the center in the width direction of the grille opening portion 4 (from right to left in FIGS. 13 to 15).

Figure 13:
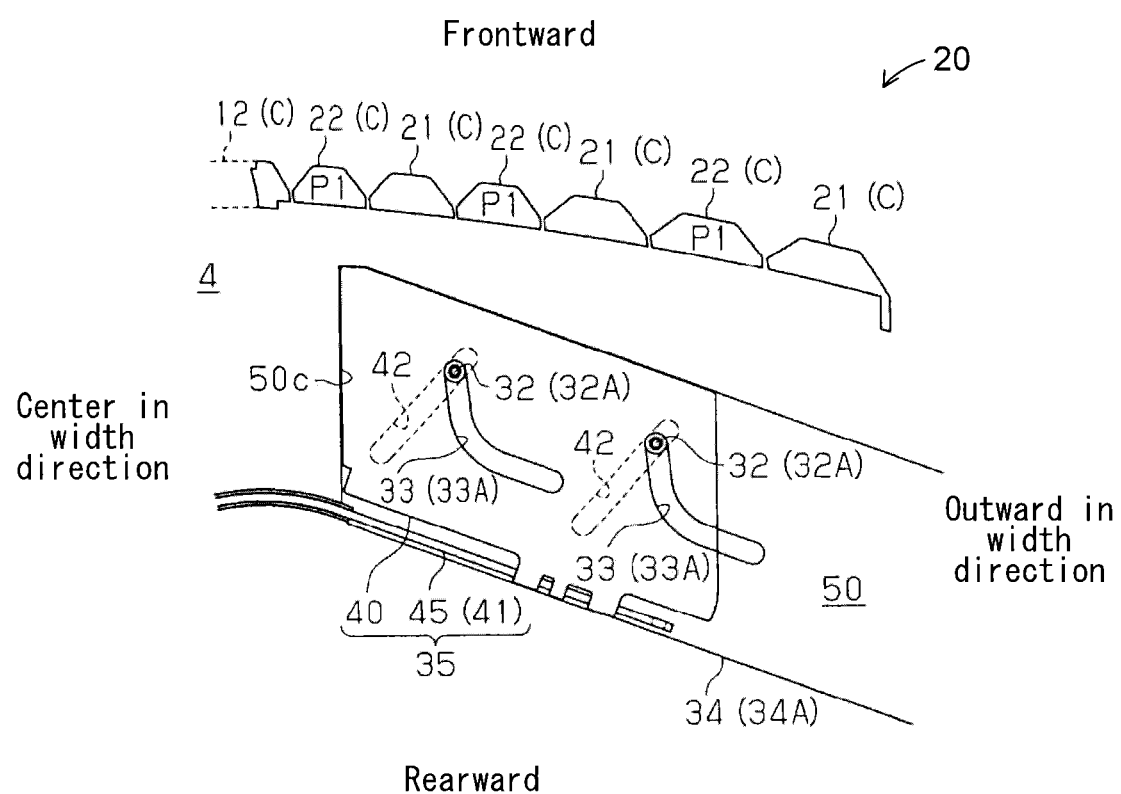
FIG. 13 is an explanatory view of an operation of the grille apparatus for a vehicle (fully-closed state) according to the embodiment.

Specifically, as illustrated in FIG. 13, when the grille apparatus 20 for a vehicle is in a fully-closed state (fully-closed position P1), the state where the first covers 21 and the second covers 22 are arranged alternately in line in the width direction of the grille opening portion 4, the moving body 40 arranged in the storage chamber 50 of the first bracket 34A is positioned close to an end wall 50c arranged at the center in the width direction of the grille opening portion 4 (left in FIG. 13). At this time, the guide protrusion 32 (32A) engaging with the guide groove 33 (33A) of the bracket 34 (34A) is positioned close to a center end of the guide groove 33 (33A) (left in FIG. 13) in the width direction of the grille opening portion 4.

Figure 14:
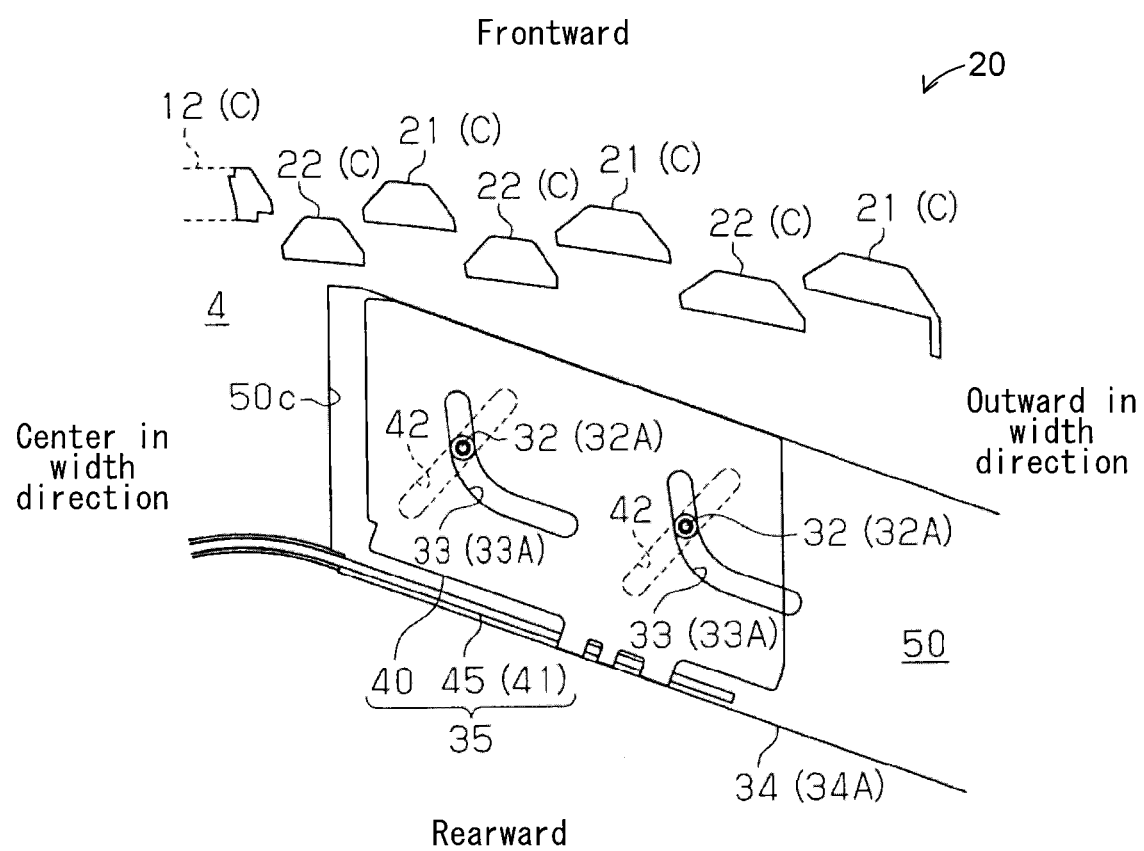
FIG. 14 is an explanatory view of the operation of the grille apparatus for a vehicle (moving state, or transitional state) according to the embodiment.
Figure 15:
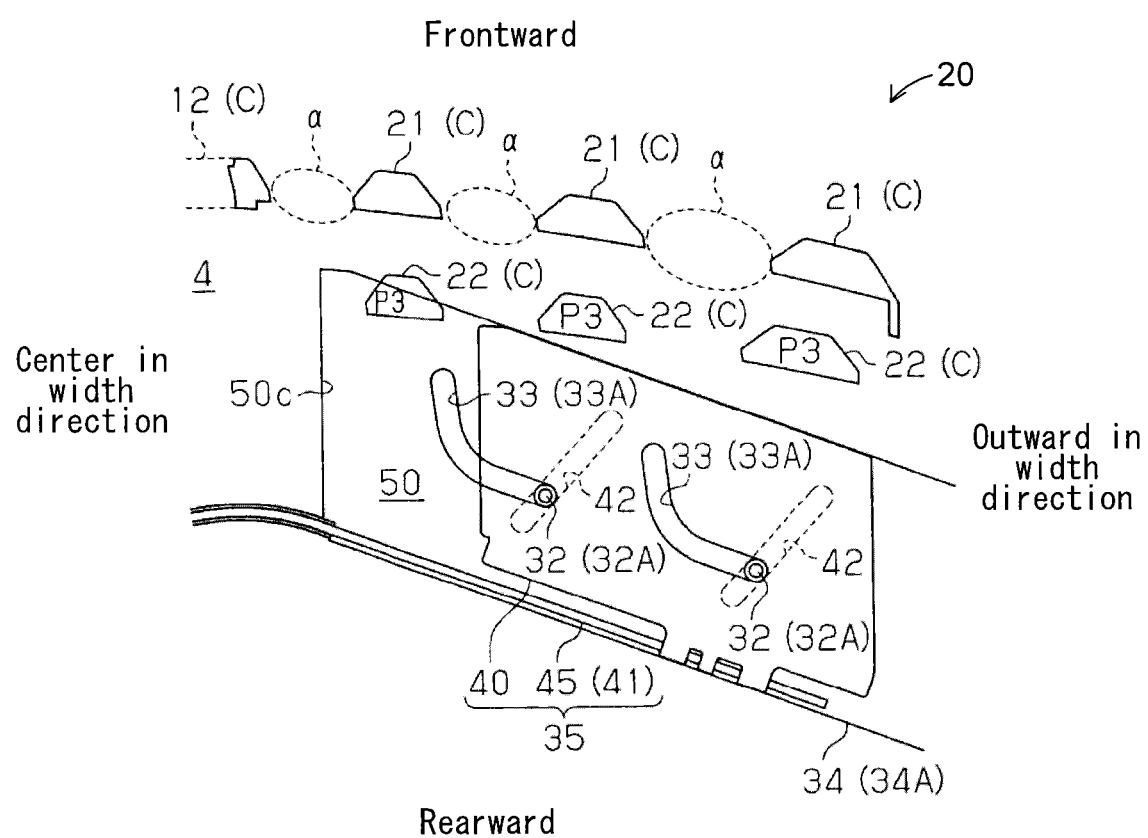
FIG. 15 is an explanatory view of the operation of the grille apparatus for a vehicle (fully-open state) according to the embodiment.

As illustrated in FIGS. 14 and 15, when the grille apparatus 20 for a vehicle performs the opening operation, the guide protrusion 32 engaging with the guide groove 33 moves from close to the center end to the outer end of the guide groove 33 in the width direction of the grille opening portion 4 in response to a sliding movement of the moving body 40 from close to the center end to the outer portion in the width direction of the grille opening portion 4. Accordingly, the second covers 22 supported by the first supporting member 31A move to the rear of the respective first covers 21, which are adjacent to the second covers 22 in the width direction of the grille opening portion 4.

As illustrated in FIGS. 13 to 15, when the grille apparatus 20 for a vehicle performs the closing operation, the guide protrusion 32 engaging with the guide groove 33 moves from close to the outer end to the center end of the guide groove 33 in the width direction of the grille opening portion 4 in response to the sliding movement of the moving body 40 from close to the outer end to close to the center end in the width direction of the grille opening portion 4. Accordingly, the second covers 22 return to the position, the fully-closed position P1 where the opening areas a formed by the second covers 22 moving to the rear of the respective first covers 21 are closed.

Further in detail, the second covers 22 move mainly in the vehicle front-rear direction of the grille opening portion 4 to accord with a curved groove-shape of the guide groove 33 at a space close to the fully-closed position P1 where the guide protrusion 32 within the guide groove 33 moves between close to the center end and close to a middle portion of the guide groove 33 in the width direction of the grille opening portion 4. The second covers 22 move mainly in the width direction of the grille opening portion 4 to accord with the curved groove-shape of the guide groove 33 at a space close to the fully-open position P3 where the guide protrusion 32 within the guide groove 33 moves between close to the middle portion and close to the outer end of the guide groove 33 in the width direction of the grille opening portion 4.

According to the embodiment, the sliding movement of the second covers 22 by the drive mechanism 30 includes a movement of the second covers 22 to the rear in the vehicle front-rear direction from the fully-closed position P1 when the opening operation is performed. The sliding movement of the second covers 22 by the drive mechanism 30 further includes a movement of the second covers 22 to a front in the vehicle front-rear direction to return to the fully-closed position P1 when the closing operation is performed (see FIGS. 13 and 14). In other words, the second covers 22 slide in the width direction of the grille opening portion 4 at the rear position in the vehicle front-rear direction without interfering the first covers 21 which are adjacent to the second covers 22. Accordingly, smooth opening and closing operations of the grille apparatus 20 for a vehicle are secured.

An Engaging position of the engaging recessed portion 42 of the moving body 40 and the guide protrusion 32 moves from close to the outer end to close to the center ends of the engaging recessed portions 42 of the in the width direction of the grille opening portion 4 when the opening operation is performed in response to the sliding movement of the moving body 40. The engaging position of the engaging recessed portion 42 of the moving body 40 and the guide protrusion 32 moves from close to the center end to close to the outer end of the engaging recessed portion 42 in the width direction of the grille opening portion 4 when the closing operation is performed in response to the sliding movement of the moving body 40. According to the embodiment, the wall surface of the engaging recessed portion 42 presses the guide protrusion 32 reliably.

The aforementioned embodiment may be changed, or modified as follows.

According to the aforementioned embodiment, air flowing via the grille opening portion 4 flows into the engine room 5 which is formed in the vehicle body 3. Alternatively, air flows into any inner space, for example, a housing of a heat exchanger such as the radiator 7 other than the engine room 5 as long as the grille apparatus 20 for a vehicle includes a clearance where air flows via the grille opening portion 4. The grille shutter apparatus 10 of the embodiment is applied to a vehicle in which an engine is arranged at a rear or a center of a vehicle body, or to a vehicle such as an electric vehicle in which an engine is not mounted on an frontward of a vehicle compartment of an inner body of a vehicle.

According to the aforementioned embodiment, each of the cover members C is arranged at the grille opening portion 4 formed at an upper the bumper 8. Alternatively, the grille opening portion 4 can be formed at a lower of the bumper 8.

According to the aforementioned embodiment, the first covers 21 and the second covers 22 are formed in the three-dimensional shape such that each of the middle portions in the vehicle up-down direction of the first covers 21 and the second covers 22 protrudes toward the center in the width direction of the grille opening portion 4 and forward of the vehicle 1. Alternatively, the shapes of the cover members C including the center cover 12 are changed, or varied arbitrarily.

In addition, the number of the cover members C can be changed, or varied arbitrarily. For example, the same as the center cover 12, the plural cover members C in which the second covers 22 do not move to the rear of the respective first covers 21 may be provided. Alternatively, the cover members C, such as the center cover 12, that are not related to the opening and closing operation of the grille opening portion 4 may not be provided. That is, the grille apparatus 20 for a vehicle may include at least one of the first covers 21 maintained within the grille opening portion 4 and at least one of the second covers 22 moving to the rear of the respective first covers 21 within the grille opening portion 4.

According to the aforementioned embodiment, when the grille opening portion 4 is closed by the first covers 21 and the second covers 22 that are arranged adjacent to one another in line in the width direction of the grille opening portion 4, the status can be defined as the fully-closed state of the grille apparatus 20 for a vehicle. However, the first covers 21 and the second covers 22 are unnecessarily arranged in a straight line. The fully-closed state of the grille apparatus 20 for a vehicle does not necessarily have to be a completely closed state in which no clearance for air flowing in is provided between the cover members C.

When the grille apparatus 20 for a vehicle is in the fully-closed state, the first covers 21 and the second covers 22 may be arranged in parallel with one another in the up-down direction of the grille opening portion 4. In this case, the drive mechanism 30 is favorably arranged at a side end of the grille opening portion 4.

When the grille apparatus 20 for a vehicle is in the fully-open state, the second covers 22 do not necessarily have to move to the rear of the respective first covers 21 completely as long as the grille opening portion 4 includes new opening areas a that directly take air into the inner space of the vehicle body 3 without being interrupted by the cover members C at a front of the vehicle body 3.

According to the aforementioned embodiment, the grille apparatus 20 for a vehicle performs opening and closing operations by sliding the second covers 22. Alternatively, the second covers 22 may, for example, rotate or incline to move to the rear of the respective first covers 21. The sliding movement of the second covers 22 may also include rotation and inclination.

According to the aforementioned embodiment, the first covers 21 are fixed to the opposite open ends in the up-down direction of the grille opening portion 4. Alternatively, the first covers 21 may be moved including rotation and inclination as long as the first covers 21 and the second covers 22 are accommodated in the grille opening portion 4 when the grille apparatus 20 for a vehicle performs the opening operation.

According to the aforementioned embodiment, the motor 25 is applied as a drive source. Alternatively, other drive sources including a solenoid may be applied as a drive source.

According to the aforementioned embodiment, the motor 25 as the drive source is arranged at a substantially center in the width direction of the grille opening portion 4. The grille apparatus 20 for a vehicle includes the left-right pair of the drive mechanisms 30 (the first drive mechanism 30L and the second drive mechanism 30R) arranged to sandwich the motor 25 in the width direction of the grille opening portion 4. Alternatively, a drive source may be positioned arbitrarily. For example, the motor 25 may be arranged at a side end in the width direction of the grille opening portion 4. In this case, all the second covers 22 may be driven by the single drive mechanism 30. Further, the motor 25 may be arranged at a position where the drive mechanisms 30 (the first drive mechanism 30L and the second drive mechanism 30R) are positioned asymmetrically relative to the motor 25.

According to the aforementioned embodiment, the drive mechanism 30 includes an up-down pair of the supporting members 31 (the first supporting member 31A, the second supporting member 31B). The lower-arranged first supporting member 31A supports the lower end portions 22a of the second covers 22 while the upper-arranged second supporting member 31B supports the upper end portions 22b of the second covers 22. Alternatively, the drive mechanism 30 may include the single supporting member 31 and the single bracket 34 corresponding to the supporting member 31.

Further, alternatively, each of the supporting members 31 (the first supporting member 31A, the second supporting member 31B) supporting the second covers 22 may include the driving force transmission mechanism 35.

The number of the guide protrusion 32 mounted to the supporting member 31 and the number of the guide groove 33 which is provided at the bracket 34 and engages with the guide protrusion 32 may be changed, or varied arbitrarily. The shape of the guide protrusion 32 may be changed, or varied arbitrarily. Further, the groove shape of the guide protrusion 32 determining a movement trajectory of each of the second covers 22 (and the supporting member 31) may be changed, or varied arbitrarily.

According to the aforementioned embodiment, the driving force transmission mechanism 35 includes the moving body 40 connected to the first supporting member 31A and the conversion mechanism 41 converting the rotational movement of the motor 25 as a drive source into the reciprocating movement of the moving body 40. According to the embodiment, the rack and pinion mechanism (the pinion gear 44 and the rack belt 45) is applied as the conversion mechanism 41. Alternatively, the structure of the conversion mechanism 41 may be arbitrarily changed, or varied as long as a mechanism can move the second covers 22 integrally with the supporting member 31 by transmitting a driving force of the motor 25 to the supporting member 31. For example, a ball screw mechanism may be applied.

According to the aforementioned embodiment, the bracket 34 (34A) includes the storage chamber 50 in which the moving body 40 is slidably accommodated. Alternatively, the position of the moving body 40 may be changed, or varied arbitrarily.

According to the aforementioned embodiment, the bracket 34 and the moving body 40 are formed in substantially flat plate-shapes. Alternatively, the shapes of the bracket 34 and the moving body 40 may be changed, or varied arbitrarily.

According to the aforementioned embodiment, the first bracket 34A is formed such that the first member 34a and the second member 34b both formed in the substantially elongated flat plate are overlapped one another. Alternatively, the first bracket 34A may be configured with a single member.

The linking structure of the moving body 40 and the supporting member 31 may be changed, or varied arbitrarily. For example, the moving body 40 may be directly connected to the supporting member 31. In a case where a linking structure in which the guide protrusion 32 (32A) and the engaging recessed portion 42 are connected is adopted, the shape of the engaging recessed portion 42 may be changed, or varied arbitrarily.

According to the embodiment, the following effects and advantages are attained.

According to the aforementioned embodiment, the grille apparatus 20 for a vehicle includes the first covers 21 arranged at the grille opening portion 4, the second covers 22 arranged at the grille opening portion 4, and the drive mechanisms 30 changing the relative position of the first covers (21) and the second covers 22 in response to the driving force of the motor 25, in which the drive mechanism 30 changes the opening amount of the front grille 2 by performing the opening operation moving the second cover 22 to the rear of the respective first cover 21, and by performing the closing operation returning the second cover 22 to the fully-closed position P1, the fully-closed position P1 before moving the second cover 22 to the rear of the respective first cover 21 while maintaining the first cover 21 and the second cover 22 within the grille opening portion 4.

According to the aforementioned structure, the opening areas a are formed between the first covers 21 adjacent to one another because the second covers 22 move to the rear of the respective first covers 21 regardless of a shape of the cover members C. Accordingly, the opening amount of the front grille 2 may be changed, or varied reliably. Further, by positioning the first covers 21 and the second covers 22 within the grille opening portion 4, the stroke of the opening and closing operations of the grille apparatus 20 for a vehicle, that is, the moving distance of the second covers 22, may be shortened. As a result, the operation time is reduced and the mountability of the device is enhanced by a size decrease of the device.

According to the aforementioned embodiment, the opening operation and the closing operation are performed by the sliding movement of the second cover 22.

According to the aforementioned structure, the relative position of the cover members C may be changed, or varied reliably. Thus, reliable opening and closing operations of the grille apparatus 20 for a vehicle may be secured.

According to the aforementioned embodiment, the sliding movement includes the movement of the second cover 22 to the rear in the vehicle front-rear direction from the fully-closed position P1 when the opening operation is performed, and the movement of the second cover 22 to the front in the vehicle front-rear direction to return to the fully-closed position P1 when the closing operation is performed.

According to the aforementioned structure, the interference between the cover members C may be prevented. Thus, the reliable opening and closing operations of the grille apparatus 20 for a vehicle may be secured.

According to the aforementioned embodiment, the drive mechanism 30 includes the supporting member 31, 31A, 31B supporting the second cover 22, the guide protrusion 32, 32A, 32B provided at the supporting member 31, 31A, 31B, the bracket 34, 34A, 34B including the guide groove 33, 33A, 33B engaging with the guide protrusion 32, 32A, 32B, and the driving force transmission mechanism 35 moving the second cover 22 integrally with the supporting member 31, 31A, 31B by transmitting the driving force of the motor 25 to the supporting member 31, 31A, 31B.

According to the aforementioned structure, the second covers 22 reliably operate the sliding movement with a simple configuration. Thus, the reliable opening and closing operations of the grille apparatus 20 for a vehicle may be secured.

According to the aforementioned embodiment, the drive mechanism 30 is arranged at the lower end portion 4a of the grille opening portion 4 in the direction intersecting the sliding movement direction of the second cover 22 within the grille opening portion 4.

According to the aforementioned structure, the supporting member 31, 31A, 31B (including the guide protrusion 32, 32A, 32B), the bracket 34 and the driving force transmission mechanism 35 which configure the drive mechanism 30 may be collectively arranged at a position where the drive mechanism 30 may not prevent air from flowing in via the grille opening portion 4. Thus, the mountability of the device may be enhanced without losing the function as the grille apparatus that takes air at a front of the vehicle 1 into the inner space of the vehicle body 3.

According to the aforementioned embodiment, the driving force transmission mechanism 35 includes the moving body 40 connected to the supporting member 31, 31A, 31B and the conversion mechanism 41 converting the driving force of the motor 25 into the reciprocating movement of the moving body 40.

According to the aforementioned structure, the moving body 40 may operate the reliable reciprocating movement by applying a simple configuration including the known rack and pinion mechanism (the pinion gear 44 and the rack belt 45). Thus, the reliable opening and closing operations may be secured while enhancing the mountability of the device.

According to the aforementioned embodiment, the bracket 34, 34A, 34B includes the storage chamber 50 slidably accommodating the moving body 40.

According to the aforementioned structure, the mountability of the device is enhanced by the size decrease of the device.

According to the aforementioned embodiment, the moving body 40 includes the engaging recessed portion 42 engaging with the guide protrusion 32, 32A, 32B to be connected to the supporting member 31, 31A, 31B.

According to the aforementioned structure, the moving body 40 and the bracket 34 may be collectively arranged. Thus, the mountability of the device is enhanced.

According to the aforementioned embodiment, the plural first covers 21 and the plural second covers 22 are arranged alternately in line when the second cover 22 is in the fully-closed position P1.

According to the aforementioned structure, the stroke of the opening and closing operations of the grille apparatus 20 for a vehicle may be shortened. In addition to the reduction of the operation time achieved by the shortening of the stroke of the opening and closing operations of the grille apparatus 20 for a vehicle, the mountability of the device is enhanced by the size decrease of the device. In addition, the aerodynamic characteristics may be further improved by arranging the cover members C in line.

According to the aforementioned embodiment, the drive mechanism 30 includes the first drive mechanism 30L and the second drive mechanism 30R that are arranged at the positions to sandwich the motor 25.

According to the aforementioned structure, two drive mechanisms 30 may be performed by a single motor, the motor 25 as a drive source, with a simple configuration. By reducing the number of the cover members C (the second covers 22) driven by the single drive mechanism 30, the stable opening and closing operations of the grille apparatus 20 for a vehicle may be reliably secured.

According to the aforementioned embodiment, the first cover 21 and the second cover 22 are arranged alternately in line in the width direction of the grille opening portion 4 when the second cover 22 is in the fully-closed position P1.

According to the aforementioned structure, the influence of the gravity almost does not have to be considered for moving the second covers 22. As a result, the reliable opening and closing operations may be secured with a further simple configuration. In addition, the aerodynamic characteristics may be further improved by arranging the cover members C in line.

According to the disclosure, the opening amount of the front grille 2 may be changed, or varied further reliably while the mountability of the device is enhanced.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A grille apparatus for a vehicle, comprising:
   a first cover arranged at an opening portion of a front grille;
   a second cover arranged at the opening portion of the front grille; and
   a drive mechanism changing a relative position of the first cover and the second cover in response to a driving force of a drive source, wherein the drive mechanism changes an opening amount of the front grille by performing an opening operation moving the second cover to a rear of the first cover, and by performing a closing operation returning the second cover to a fully-closed position, the fully-closed position being a position before the second cover is moved to the rear of the first cover while maintaining the first cover and the second cover within the opening portion of the front grille,
   wherein the opening operation and the closing operation are performed by a sliding movement of the second cover,
   wherein the drive mechanism includes a supporting member supporting the second cover, a guide protrusion provided at the supporting member, a bracket including a guide groove engaging with the guide protrusion, and a driving force transmission mechanism moving the second cover integrally with the supporting member by transmitting the driving force of the drive source to the supporting member,
   wherein the driving force transmission mechanism includes a moving body connected to the supporting member and a conversion mechanism converting the driving force of the drive source into a reciprocating movement of the moving body, and
   wherein the moving body includes an engaging recessed portion engaging with the guide protrusion to be connected to the supporting member.

2. The grille apparatus for a vehicle according to claim 1, wherein the sliding movement includes a movement of the second cover to a rear in a vehicle front-rear direction from the fully-closed position when the opening operation is performed, and a movement of the second cover to a front in the vehicle front-rear direction to return to the fully-closed position when the closing operation is performed.

3. The grille apparatus for a vehicle according to claim 1, wherein the drive mechanism is arranged at an end portion of the opening portion of the front grille in a direction intersecting a sliding movement direction of the second cover within the opening portion of the front grille.

4. The grille apparatus for a vehicle according to claim 1, wherein the bracket includes a storage chamber slidably accommodating the moving body.

5. The grille apparatus for a vehicle according to claim 1, wherein a plurality of the first covers and a plurality of the second covers are arranged alternately in line when the second cover is in the fully-closed position.

6. The grille apparatus for a vehicle according to claim 1 wherein the drive mechanism includes a first drive mechanism and a second drive mechanism that are arranged at positions to sandwich the drive source.

7. The grille apparatus for a vehicle according to claim 1, wherein the first cover and the second cover are arranged alternately in line in the width direction of the opening portion of the front grille when the second cover is in the fully-closed position.

\* \* \* \* \*